US010997913B2

(12) United States Patent
Han et al.

(10) Patent No.: US 10,997,913 B2
(45) Date of Patent: May 4, 2021

(54) METHOD AND APPARATUS FOR CONTROLLING DRIVE CURRENT OF DISPLAY PANEL, ELECTRONIC DEVICE, AND STORAGE MEDIUM

(71) Applicant: BOE TECHNOLOGY GROUP CO., LTD., Beijing (CN)

(72) Inventors: Dongxu Han, Beijing (CN); Tieshi Wang, Beijing (CN); Zhongyuan Wu, Beijing (CN); Yongqian Li, Beijing (CN); Chi Zhang, Beijing (CN); Jinxia Hu, Beijing (CN); Wei Chen, Beijing (CN); Pan Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/453,233

(22) Filed: Jun. 26, 2019

(65) Prior Publication Data

US 2020/0035155 A1 Jan. 30, 2020

(30) Foreign Application Priority Data

Jul. 27, 2018 (CN) ........................ 201810848089.5

(51) Int. Cl.
*G06F 3/038* (2013.01)
*G09G 3/3233* (2016.01)

(52) U.S. Cl.
CPC ... *G09G 3/3233* (2013.01); *G09G 2320/0233* (2013.01)

(58) Field of Classification Search
CPC .................... G09G 3/3233; G09G 2320/0233
USPC ........................................................ 345/211
See application file for complete search history.

(56) References Cited

U.S. PATENT DOCUMENTS

2007/0071318 A1* 3/2007 Yamashita ........... H04N 1/4074 382/169
2014/0063074 A1* 3/2014 Drzaic ..................... G09G 3/30 345/690
2015/0213757 A1* 7/2015 Takahama ............ G09G 3/3233 345/691
(Continued)

FOREIGN PATENT DOCUMENTS

CN 101217021 7/2008
CN 103996374 8/2014
(Continued)

OTHER PUBLICATIONS

CN First Office Action dated Nov. 4, 2019 for Chinese Patent Application No. 201810848089.5.

*Primary Examiner* — Jonathan M Blancha
(74) *Attorney, Agent, or Firm* — Thomas | Horstemeyer, LLP

(57) ABSTRACT

The present disclosure relates to a method and an apparatus for controlling a drive current of a display panel, an electronic device, and a storage medium. A standard drive current of the display panel is calculated based on the power function of the display panel. An actual drive current is detected in a working process of the display panel, and it is determined whether the actual drive current exceeds the standard by comparing the actual drive current with the standard drive current. The actual drive current is regulated if the actual drive current exceeds the standard.

17 Claims, 4 Drawing Sheets

(56) References Cited

U.S. PATENT DOCUMENTS

| | | | | |
|---|---|---|---|---|
| 2016/0095194 | A1* | 3/2016 | Yoneoka | H05B 45/50 315/121 |
| 2016/0267876 | A1* | 9/2016 | Kim | G09G 5/10 |
| 2018/0288377 | A1* | 10/2018 | Furuya | H04N 9/3155 |

FOREIGN PATENT DOCUMENTS

| | | |
|---|---|---|
| CN | 106297674 | 1/2017 |
| CN | 106611583 | 5/2017 |
| CN | 107731165 | 2/2018 |

* cited by examiner

METHOD AND APPARATUS FOR CONTROLLING DRIVE CURRENT OF DISPLAY PANEL, ELECTRONIC DEVICE, AND STORAGE MEDIUM

CROSS-REFERENCE TO RELATED APPLICATION

This application is based upon, claims the benefit of, and claims priority to Chinese Patent Application No. 201810848089.5, filed on Jul. 27, 2018, the entire contents thereof are incorporated herein by reference.

TECHNICAL FIELD

The present disclosure generally relates to the field of display technologies and, more particularly, to a method and an apparatus for controlling a drive current of a display panel, an electronic device, and a storage medium.

BACKGROUND

With the progress of various technologies, OLED screens are becoming more and more widely used because OLED screens do not require any backlight, are high in contrast, thin in thickness, wide in viewing angle, fast in response speed, applicable to flexible panels, wide in operating temperature range, simpler to construct and manufacture, and so forth.

It is to be noted that the above information disclosed in this Background section is only for enhancement of understanding of the background of the present disclosure and therefore, it may contain information that does not form the related art that is already known to a person of ordinary skill in the art.

SUMMARY

The present disclosure provides a method and an apparatus for controlling a drive current of a display panel, an electronic device, and a storage medium.

According to a first aspect of the present disclosure, there is provided a method for controlling a drive current of a display panel, including:

determining a power function of the display panel;

calculating a standard drive current of the display panel based on the power function;

detecting an actual drive current of the display panel;

determining whether the actual drive current exceeds a standard by comparing the actual drive current with the standard drive current; and regulating the actual drive current if the actual drive current exceeds the standard.

According to an embodiment of the present disclosure, the determining of a power function of the display panel includes:

detecting standard drive currents corresponding to a plurality of power factors of the display panel, the power factor being a ratio of a sum of brightnesses of lit pixels on the display panel to a sum of maximum brightnesses of all pixels; and determining the power function of the display panel based on the standard drive currents corresponding to the plurality of power factors of the display panel and a type of the power function.

According to an embodiment of the present disclosure, the power function is a piecewise function.

According to an embodiment of the present disclosure, the detecting of drive currents corresponding to a plurality of power factors of the display panel includes:

detecting a drive current corresponding to a power factor at a demarcation point of the power function.

According to an embodiment of the present disclosure, the calculating of a standard drive current of the display panel includes:

calculating a standard drive current corresponding to each power factor of the display panel, and storing the standard drive current.

According to an embodiment of the present disclosure, the determining of whether the actual drive current exceeds the standard by comparing the actual drive current with the standard drive current includes:

obtaining the stored standard drive current;

multiplying the standard drive current by a specified coefficient to obtain a standard drive current threshold; and comparing the actual drive current with the standard drive current threshold, and determining that the actual drive current exceeds the standard if the actual drive current is greater than the standard drive current threshold.

According to an embodiment of the present disclosure, the regulating of the actual drive current if the actual drive current exceeds the standard includes:

reducing a drive voltage if the actual drive current exceeds the standard to reduce the actual drive current.

According to a second aspect of the present disclosure, there is provided an apparatus for controlling a drive current of a display panel, including:

a power function determining module, configured to determine a power function of the display panel;

a standard drive current calculating module, configured to calculate a standard drive current of the display panel based on the power function;

a detecting module, configured to detect an actual drive current of the display panel;

a determining module, configured to determine whether the actual drive current exceeds standard by comparing the actual drive current with the standard drive current; and a regulating module, configured to regulate the actual drive current if the actual drive current exceeds the standard.

According to a third aspect of the embodiments of the present disclosure, there is provided an electronic device, including:

a processor; and a memory storing computer-readable instructions thereon, wherein, when the computer-readable instructions are executed by the processor, the method according to any one of the above embodiments is implemented.

According to a fourth aspect of the embodiments of the present disclosure, there is provided a computer-readable storage medium, which stores a computer program. When the computer program is executed by a processor, the method according to any one of the above embodiments is performed.

It is to be understood that the above general description and the detailed description below are merely exemplary and explanatory, and do not limit the present disclosure.

BRIEF DESCRIPTION OF THE DRAWINGS

The above and other features and advantages of the present disclosure will become more apparent by describing in detail the exemplary embodiments thereof with reference to the accompanying drawings.

DETAILED DESCRIPTION

Figure 1:
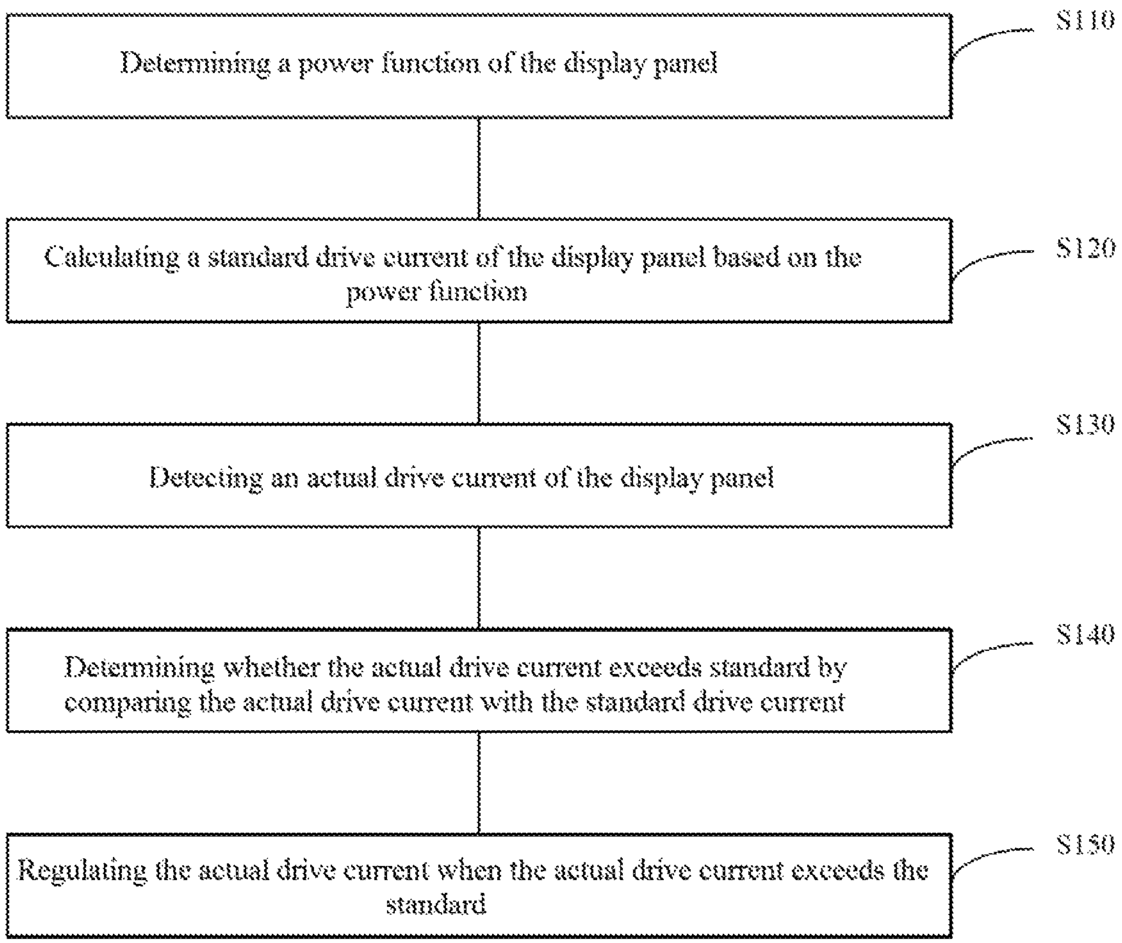
FIG. 1 schematically illustrates a flowchart of a method for controlling a drive current of a display panel according to an exemplary embodiment of the present disclosure.

The exemplary embodiments will now be described more fully with reference to the accompanying drawings. However, the exemplary embodiments can be implemented in a variety of forms and should not be construed as limited to the embodiments set forth herein. Rather, the embodiments are provided so that this disclosure will be thorough and complete, and will fully convey the concepts of exemplary embodiments to those skilled in the art. The same reference numerals in the drawings denote the same or similar parts, and thus repeated description thereof will be omitted.

In addition, the features, structures, or characteristics described may be combined in one or more embodiments in any suitable manner. In the following description, numerous specific details are provided to give a full understanding of the embodiments of the present disclosure. However, those skilled in the art will appreciate that the technical solutions of the present disclosure can be practiced without one or more of the specific details, or other methods, components, materials, devices, steps, and the like may be employed. In other instances, well-known structures, methods, devices, implementations, materials, or operations are not shown or described in detail to avoid obscuring aspects of the present disclosure.

The block diagrams illustrated in the drawings are merely functional entities and do not necessarily correspond to any physically separate entity. That is, these functional entities may be implemented in software form, or these functional entities or a part of these functional entities may be implemented in one or more software or hardware modules, or these functional entities may be implemented in different networks and/or processor apparatuses and/or microcontroller apparatuses.

In the related art, current flowing through organic light-emitting diode (OLED) screens may vary as light illumination and temperature of the OLED screens change. Further, brightness fluctuation of the OLED screens causes larger brightness variations, which has a negative effect on the quality of the display. Furthermore, the current variation may affect the service lives of light-emitting materials and the entire drive circuits of the OLED screens.

The method for controlling a drive current of a display panel provided by the embodiments of the present disclosure is used for controlling the drive current of the display panel to prevent excessive drive current of the display panel from having a negative effect on the display effect and the service life of the display panel. This method is mainly applicable to display panels, such as OLED display panels, whose drive currents may fluctuate due to variation of environmental conditions such as light illumination and temperature.

FIG. 1 schematically illustrates a flowchart of a method for controlling a drive current of a display panel according to an embodiment of the present disclosure. As shown in FIG. 1, this method includes:

Step S110: determining a power function of the display panel;

Step S120: calculating a standard drive current of the display panel based on the power function;

Step S130: detecting an actual drive current of the display panel;

Step S140: determining whether the actual drive current exceeds a standard by comparing the actual drive current with the standard drive current; and Step S150: regulating the actual drive current if the actual drive current exceeds the standard.

According to the method for controlling a drive current of a display panel provided by the present disclosure, a standard drive current of the display panel is calculated based on the power function of the display panel, an actual drive current is detected in a working process of the display panel, and it is determined whether the actual drive current exceeds the standard by comparing the actual drive current with the standard drive current. The actual drive current is regulated if the actual drive current exceeds the standard. In one aspect, by regulating the actual drive current, the problem that is solved includes the display effect being negatively affected by larger brightness variations caused by brightness fluctuation of the display panel due to the drive current flowing through the display panel varying as light illumination and temperature change, and thus the display effect is improved. In another aspect, a phenomenon prevented includes excessive drive current damaging the light-emitting material and the drive circuit of the display panel, and thus the service life of the display panel is prolonged.

The method for controlling a drive current of a display panel in this exemplary embodiment will be further described below.

In Step S110, a power function of the display panel may be determined.

In the working process of the display panel, a power factor of the display panel is the ratio of the sum of brightnesses of lit pixels on the display panel to the sum of maximum brightnesses of all pixels, as shown in Formula 1:

$$APL = \frac{\text{sum}}{\text{SUM}} \quad (1)$$

wherein APL represents the power factor, "sum" represents the sum of the brightnesses of the lit pixels on the display panel, and "SUM" represents the sum of the maximum brightnesses of all the pixels.

According to a power control function of the display panel, it may be obtained that the power function of the display panel is a function with respect to the APL, and the type of the power function is the same as that of the power control function. According to the type of the power function, a plurality of power factors are selected, and drive currents corresponding to the plurality of power factors are detected.

In the display panel, generally the drive current is linearly related to the brightness of the display panel, and thus, the current brightness of the display panel may be calculated based on the drive current. A current power may be obtained based on the ratio of the current brightness of the display panel to the maximum brightness. That is, data of multiple sets of powers and power factors are obtained, and the power function corresponding to the display panel may be obtained based on the data of multiple sets of powers and power factors and the type of the power function.

For example, for an OLED display panel, its power control function is a piecewise function, and each segment is a linear function. The drive currents corresponding to the power factors of an end point and a demarcation point of the piecewise function are detected, then, the powers corresponding to the power factors of the end point and the demarcation point of the piecewise function are calculated based on the drive currents, and thereafter, the power function is obtained. In practical application, the end points of the power function may be selected as a window point of 5% of highest grayscale and a point of a full screen highest grayscale, and the drive currents corresponding to the two end points may be respectively detected.

Of course, in practical application, the power control functions of the display panel may also be other types of functions, and the corresponding power functions are also other types of functions, which are not specifically limited in the embodiments of the present disclosure. At this moment, a detection point of the power factor may be adjusted to obtain the power factor and the corresponding drive current so as to determine the power function. For example, the power control function may be a quadratic function, and the power function is also a quadratic function. Three different power factor detection points may be selected to detect the corresponding current, and then, the quadratic function is determined.

It is to be noted that the drive current corresponding to the power factor is detected under standard light illumination and temperature conditions to prevent variation of light illumination and temperature from having a negative effect on the detection results.

In Step S120, a standard drive current of the display panel may be calculated based on the power function. The standard drive current is the drive current of the display panel under theoretical conditions. A curve of the standard drive current may be obtained through the power function.

Each power factor is put into the power function to calculate the power corresponding to each power factor. The brightness corresponding to each power factor is calculated through the power. The standard drive current corresponding to each power factor is calculated based on the brightness of the display panel, and the standard drive current corresponding to each power factor is stored in a storage unit of the controller.

For example, the power function of the display panel is a piecewise linear function, and each power factor is put into the piecewise linear function to obtain the power corresponding to each power factor. The standard brightness corresponding to the power factor may be obtained by multiplying the maximum brightness of the display panel by the corresponding power, and the standard drive current is calculated out based on the standard brightness.

In Step S130, the actual drive current of the display panel may be detected, wherein the actual drive current is the drive current actually detected when the display panel is working.

In the working process of the display panel, the actual drive current may fluctuate due to variation of the ambient environment. For example, the drive current of the OLED display panel may vary as light illumination and temperature change. If the display panel or other devices including the display panel are used in a place where the temperature changes greatly, the drive current may fluctuate greatly, and there exists a large gap between the actual drive current and the standard drive current. Moreover, when the same screen is lit up by the OLED display panel, the longer the lighting time is, the longer the drive current of the display panel. That is, under the same power factor, the actual drive current of the display panel may also fluctuate, and thus, it is required to detect the actual drive current of the display panel in real time.

In the working process of the display panel, the actual drive current corresponding to the power factor of the current display panel is detected in real time.

Figure 5:
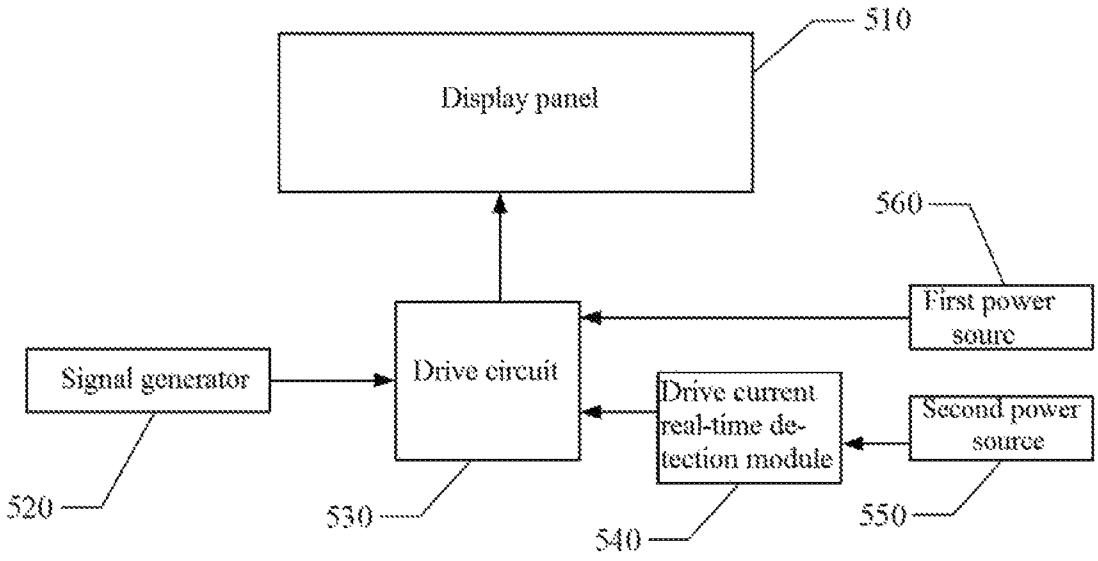
FIG. 5 schematically illustrates a schematic diagram of an apparatus for detecting a drive current of a display panel according to an exemplary embodiment of the present disclosure.
Figure 6:
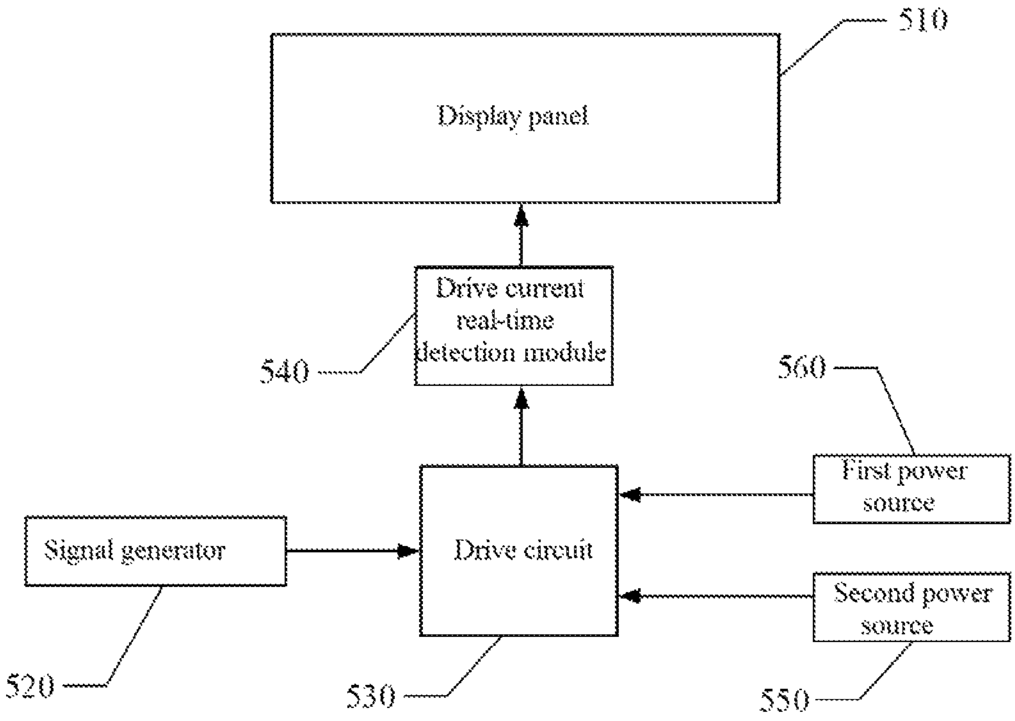
FIG. 6 schematically illustrates a schematic diagram of an apparatus for detecting a drive current of a display panel according to another exemplary embodiment of the present disclosure.

For example, the display panel drive current detection device may be a device as shown in FIG. 5, including a drive current real-time detection module 540. The drive current real-time detection module 540 is connected to a drive circuit 530 of the display panel 510, and the drive circuit is connected to a signal generator 520. The drive circuit is connected to a first power source 560, and the drive current real-time detection module 540 is connected to a second power source 550. The first power source 560 may be a logic power source. In another aspect, the display panel drive current detection device may be a device as shown in FIG. 6, the drive current real-time detection module 540 is arranged between the drive circuit 530 and the display panel 510, and the first power source 560, the second power source 550, and the signal generator 520 are connected to drive circuit 530.

In Step S140, it is determined whether the actual drive current exceeds standard by comparing the actual drive current with the standard drive current.

In the working process of the display panel, the power factor of the current display panel is calculated according to the display content of the display panel, and the actual drive current of the display panel under the power factor is detected in real time. The standard drive current corresponding to the power factor obtained in Step S120 is obtained. A standard drive current threshold is obtained by multiplying the standard drive current by a specified coefficient. The actual drive current is compared with the standard drive current threshold, and it is determined that the actual drive current exceeds the standard if the actual drive current exceeds the standard drive current threshold.

The specified coefficient is a numerical value greater than or equal to 1, and the specified coefficient is set according to actual work requirements. For example, if more than 10% is required as a restrictive condition and the display panel still can work properly, the specified coefficient is 1.1. If restrictive conditions of other values are required in actual application, the specified coefficient may be adjusted.

The actual drive current exceeds the standard if the actual drive current is greater than the standard drive current threshold. The actual drive current does not exceed the standard if the actual drive current is less than or equal to the standard drive current threshold.

Comparing the actual drive current with the standard drive current is also carried out in real time. When the display panel displays the same content, the drive current consumed may also fluctuate. By comparing the actual drive current with the standard drive current in real time, it is determined in real time whether the actual drive current exceeds the standard.

In Step S150, the actual drive current may be regulated if the actual drive current exceeds the standard.

A drive voltage may be reduced if the actual drive current exceeds the standard to reduce the actual drive current. When reducing the drive voltage, the drive voltage may be gradually reduced within a designated time, and drive current feedback time and the perception of a human eye are taken into consideration, so as to prevent a sudden voltage drop from causing a sudden change in the brightness of the display panel, having a negative effect on the display effect and degrading the user experience.

If the actual drive current does not exceed the standard, i.e., the actual drive current is less than the standard drive current threshold, the current working status continues to be maintained.

Adjustment of the display panel may be implemented by a voltage regulating device. When the actual drive current is greater than the standard drive current threshold, a controller sends a voltage regulation signal, and the voltage regulating device receives the voltage regulation signal to regulate the drive voltage. The voltage regulation signal may include information such as a regulation trigger instruction, a regulation amount, and regulation time to control the drive voltage to decrease by a specified regulation amount within the regulation time.

It is to be noted that, steps of the method in the present disclosure are described in a particular order in the accompanying drawings. However, this does not require or imply to perform these steps necessarily according to the particular order, or this does not mean that the expected result cannot be implemented unless all the shown steps are performed. Additionally or alternatively, some steps may be omitted, a plurality of steps may be combined into one step for performing, and/or one step may be decomposed into a plurality of steps for execution.

Figure 2:
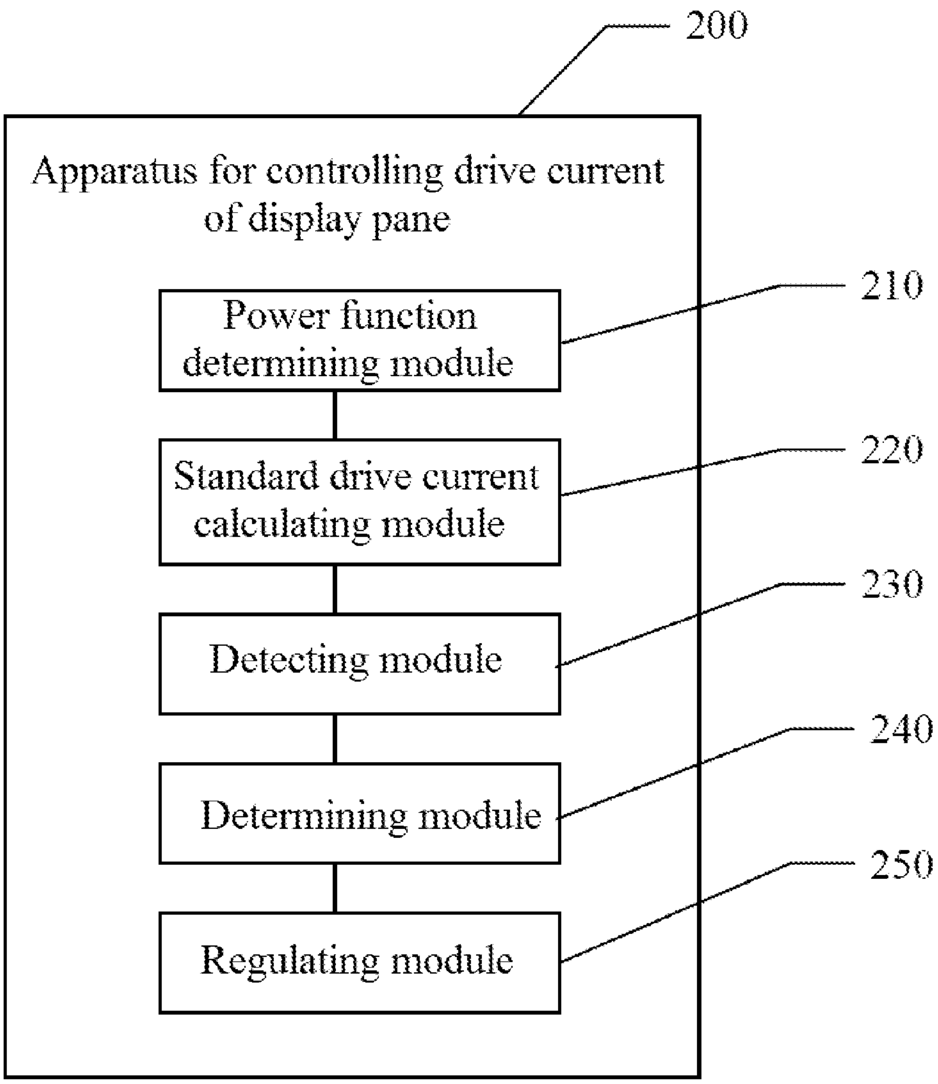
FIG. 2 schematically illustrates a block diagram of an apparatus for controlling a drive current of a display panel according to an exemplary embodiment of the present disclosure.

Furthermore, in this exemplary embodiment, there is also provided an apparatus 200 for controlling a drive current of a display panel. Referring to FIG. 2, the apparatus 200 for controlling a drive current of a display panel includes a power function determining module 210, a standard drive current calculating module 220, a detecting module 230, a determining module 240, and a regulating module 250.

The power function determining module 210 may be configured to determine a power function of the display panel.

The standard drive current calculating module 220 may be configured to calculate a standard drive current of the display panel based on the power function.

The detecting module 230 may be configured to detect an actual drive current of the display panel.

The determining module 240 may be configured to determine whether the actual drive current exceeds the standard by comparing the actual drive current with the standard drive current.

The regulating module 250 may be configured to regulate the actual drive current if the actual drive current exceeds the standard.

According to the apparatus for controlling a drive current of a display panel provided by the present disclosure, a standard drive current of the display panel is calculated based on the power function of the display panel, an actual drive current is detected in a working process of the display panel, and it is determined whether the actual drive current exceeds the standard by comparing the actual drive current with the standard drive current. The actual drive current is regulated if the actual drive current exceeds the standard. In one aspect, by regulating the actual drive current, the problem that is solved includes display effect being negatively affected by larger brightness variations caused by brightness fluctuation of the display panel due to the drive current flowing through the display panel varying as light illumination and temperature change, and thus, the display effect is improved. In another aspect, a phenomenon that is prevented includes excessive drive current damaging the light-emitting material and the drive circuit of the display panel, and thus, the service life of the display panel is prolonged.

Specific details of each module of the above apparatus for controlling a drive current of a display panel have been described in detail in the corresponding method for controlling a drive current of a display panel, and thus, their detailed descriptions are omitted herein.

It is to be noted that although a plurality of modules or units of the apparatus 200 for controlling a drive current of a display panel have been mentioned in the above detailed description, this partition is not compulsory. Actually, according to the embodiment of the present disclosure, features and functions of two or more modules or units as described above may be embodied in one module or unit. Conversely, features and functions of one module or unit as described above may be further embodied in more modules or units.

Furthermore, in an exemplary embodiment of the present disclosure, there is also provided an electronic device that can implement the above method. The electronic device may be a timing control circuit board (Tcon), or may be a display or a terminal including the timing circuit board, which is not specifically limited in the embodiments of the present disclosure.

As will be appreciated by one skilled in the art, aspects of the present disclosure may be embodied as a system, method, or program product. Accordingly, aspects of the present disclosure may specifically take the form of an entirely hardware embodiment, an entirely software embodiment (including firmware, micro-code, etc.) or an embodiment combining software and hardware aspects that may all generally be referred to herein as a "circuit," "module" or "system."

The electronic device 300 according to this embodiment of the present disclosure is described below with reference to FIG. 3. The electronic device 300 as shown in FIG. 3 is merely an example, and no limitation should be imposed on functions or scope of use of the embodiment of the present disclosure.

Figure 3:
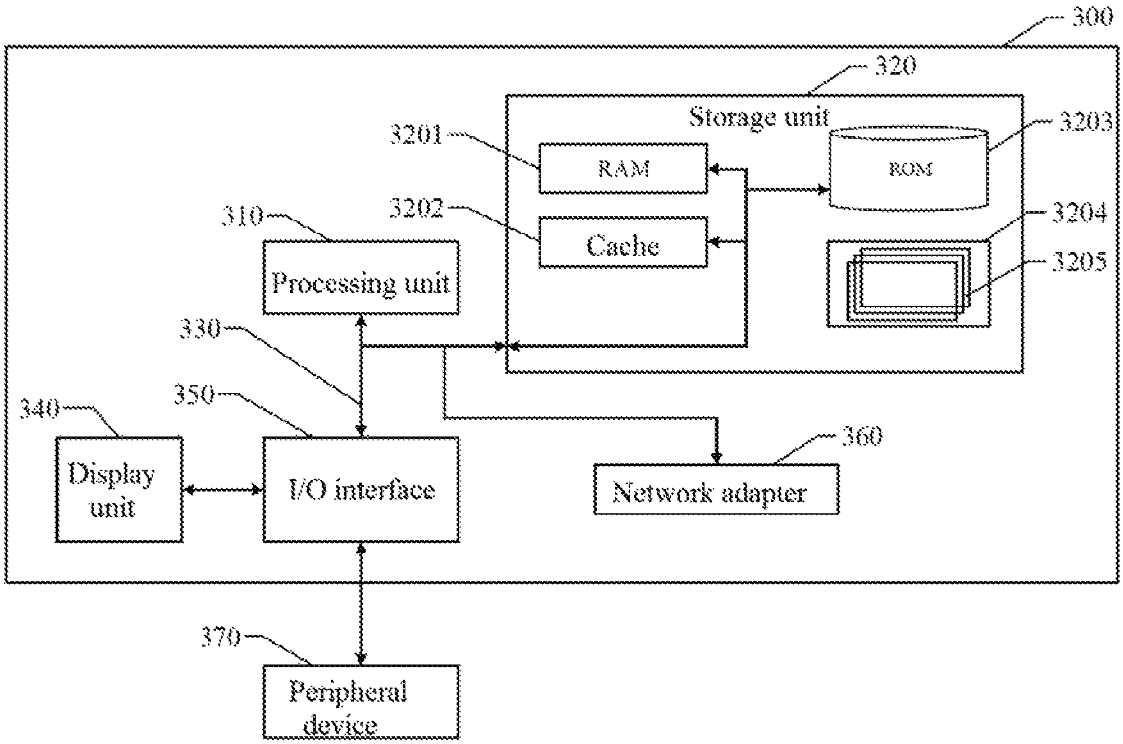
FIG. 3 schematically illustrates a block diagram of an electronic device according to an exemplary embodiment of the present disclosure.

As shown in FIG. 3, the electronic device 300 is shown in the form of a general-purpose computing device. Components of the electronic device 300 may include, but are not limited to: at least one processing unit 310, at least one storage unit 320, a bus 330 connecting different system components (including the storage unit 320 and the processing unit 310), and a display unit 340. The at least one processing unit 310 may comprise at least one hardware processor.

The storage unit 320 stores a program code, which may be executed by the processing unit 310 such that the processing unit 310 performs steps described in the above "exemplary method" according to exemplary embodiments of the present disclosure.

The memory 320 may include readable media in the form of volatile memory, such as a random access memory (RAM) 3201 and/or a cache memory 3202. Furthermore, the memory 320 may include a read-only memory (ROM) 3203.

The memory 320 may include a program/utility tool 3204 having a group of (at least one) program modules 3205. The program modules 3205 include, but are not limited to: an operating system, one or more applications, other program modules and program data. Each or a certain combination of these examples may include implementation of network environment.

The bus 330 may represent one or more of a plurality of bus structures, including a memory bus or memory controller, a peripheral bus, an accelerated graphics port, a processing unit or a local bus using any bus structure among the plurality of bus structures.

The electronic device 300 may communicate with one or more peripheral devices 370 (such as keyboards, pointing devices, Bluetooth devices, etc.), and also may communicate with one or more devices allowing a user to interact with the electronic device 300, and/or may communicate with any device (for example, a router, a modem and so on) allowing the electronic device 300 to communicate with one or more other computing devices. This communication may be implemented by means of an input/output (I/O) interface 350. Moreover, the electronic device 300 also may communicate with one or more networks (for example, a local area network (LAN), a wide area network (WAN) and/or a public network such as the Internet) via a network adapter 360. As shown in FIG. 6, the network adapter 340 communicates with other modules of the electronic device 300 through the bus 330. It should be understood that although not shown in the figures, other hardware and/or software modules may be used in combination with the electronic device 300, including but not limited to: microcode, device drivers, redundancy processing units, external disk drive arrays, redundant arrays of independent disks (RAID) systems, tape drives and data backup and storage systems, etc.

Based on the description of the embodiments above, it will be readily understood by those skilled in the art that the exemplary embodiments described herein may be implemented by software or may be implemented by means of software in combination with the necessary hardware. Thus, the technical solution according to the embodiments of the present disclosure may be embodied in the form of a software product which may be stored in a nonvolatile storage medium (which may be CD-ROM, USB flash disk, mobile hard disk and the like) or on network, including a number of instructions for enabling a computing device (which may be a personal computer, a server, a terminal device, or a network device and the like) to perform the method according to the embodiments of the present disclosure.

In an exemplary embodiment of the present disclosure, there is further provided a non-transitory computer readable storage medium storing a program product capable of implementing the above method in the specification. In some possible embodiments, aspects of the present disclosure may be implemented as a form of a program product, which includes program code. When the program product runs on the terminal device, the program code is used for enabling the terminal device to perform the steps described in the above exemplary method of this specification according to the exemplary embodiments of the present disclosure.

Figure 4:
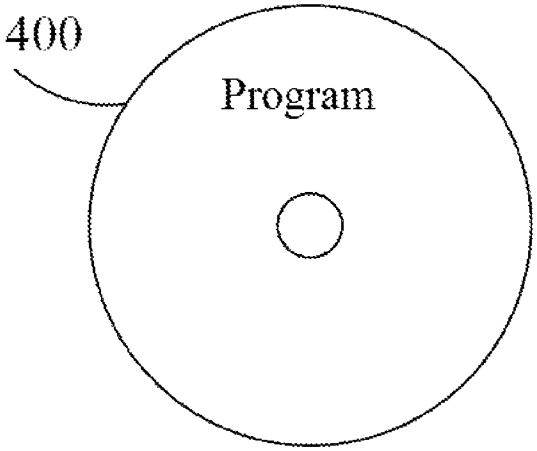
FIG. 4 schematically illustrates a schematic diagram of a computer-readable storage medium according to an exemplary embodiment of the present disclosure.

Referring to FIG. 4, a program product 400 configured to implement the above method is described according to the embodiments of the present disclosure. The program product 700 may adopt a portable compact disc read-only memory (CD-ROM) and include a program code, and may run on a terminal device such as a personal computer. However, the program product of the present disclosure is not limited thereto. In this disclosure, a readable storage medium may be any tangible medium that can contain or store a program for use by or in connection with an instruction execution system, apparatus, or device.

Any combination of one or more non-transitory readable medium(s) may be utilized by the program product. The readable medium may be a readable signal medium or a readable storage medium. The readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the readable storage medium include the following: an electrical connection having one or more wires, a portable diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

A computer readable signal medium may include a propagated data signal with readable program code embodied therein, for example, in baseband or as part of a carrier wave. Such a propagated data signal may take any of a variety of forms, including, but not limited to, electro-magnetic, optical, or any suitable combination thereof. A readable signal medium may be any readable medium that is not a readable storage medium and that can communicate, propagate, or transport a program for use by or in connection with an instruction execution system, apparatus, or device.

Program code embodied on a readable medium may be transmitted using any appropriate medium, including but not limited to wireless, wireline, optical fiber cable, RF, etc., or any suitable combination of the foregoing.

Program code for carrying out operations of the present disclosure may be written in any combination of one or more programming languages, including an object-oriented programming language such as Java, C++ or the like and conventional procedural programming languages, such as the "C" programming language or similar programming languages. The program code may execute entirely on the user's computing device, partly on the user's computing device, as a stand-alone software package, partly on the user's computing device and partly on a remote computing device or entirely on the remote computing device or server. In the latter scenario, the remote computing device may be connected to the user's computing device through any type of network, including a local area network (LAN) or a wide area network (WAN), or the connection may be made to an external computing device (for example, through the Internet using an Internet Service Provider).

Moreover, the above accompanying drawings are merely illustrative description of processes included in the method according to the exemplary embodiments of the present disclosure and are not intended to limit the present disclosure. It is apparent to understand that the processes shown in the above accompanying drawings do not indicate or limit time sequences of these processes. Furthermore, it is also apparent to understand that these processes may be executed, for example, synchronously or asynchronously in a plurality of modules.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and embodiments be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for controlling a drive current of a display panel, comprising:
- determining a power function of the display panel by:
  - detecting drive currents corresponding to a plurality of power factors of the display panel, the power factors being a ratio of a sum of brightnesses of lit pixels on the display panel to a sum of maximum brightnesses of all pixels; and
  - determining the power function of the display panel based on the drive currents corresponding to the plurality of power factors of the display panel and a type of the power function;
- calculating a standard drive current of the display panel based on the power function;
- detecting an actual drive current of the display panel;
- determining whether the actual drive current exceeds the standard drive current by comparing the actual drive current with the standard drive current; and
- regulating the actual drive current when the actual drive current exceeds the standard drive current.

2. The method for controlling the drive current of the display panel according to claim 1, wherein the power function is a piecewise function.

3. The method for controlling the drive current of the display panel according to claim 2, wherein the detecting of the drive currents corresponding to the plurality of power factors of the display panel comprises: detecting a drive current corresponding to a power factor at a demarcation point of the power function.

4. The method for controlling the drive current of the display panel according to claim 1, wherein the calculating of the standard drive current of the display panel comprises: calculating a standard drive current corresponding to each power factor of the display panel, and storing the standard drive current in memory.

5. The method for controlling the drive current of the display panel according to claim 4, wherein the determining whether the actual drive current exceeds the standard drive current by comparing the actual drive current with the standard drive current comprises:
- obtaining the standard drive current as stored in the memory;
- multiplying the standard drive current by a specified coefficient to obtain a standard drive current threshold;
- comparing the actual drive current with the standard drive current threshold; and
- determining that the actual drive current exceeds the standard drive current when the actual drive current is greater than the standard drive current threshold.

6. The method for controlling the drive current of the display panel according to claim 1, wherein the regulating of the actual drive current if the actual drive current exceeds the standard comprises: reducing a drive voltage when the actual drive current exceeds the standard to reduce the actual drive current.

7. An electronic device, comprising:
- at least one hardware processor; and
- a memory storing computer-readable instructions thereon that, when executed by the at least one hardware processor, implement a method for controlling a drive current of a display panel, the method comprising:
  - determining a power function of the display panel by:
    - detecting drive currents corresponding to a plurality of power factors of the display panel, the power factor being a ratio of a sum of brightnesses of lit pixels on the display panel to a sum of maximum brightnesses of all pixels; and
    - determining the power function of the display panel based on the drive currents corresponding to the plurality of power factors of the display panel and a type of the power function;
  - calculating a standard drive current of the display panel based on the power function;
  - detecting an actual drive current of the display panel;
  - determining whether the actual drive current exceeds the standard drive current by comparing the actual drive current with the standard drive current; and
  - regulating the actual drive current when the actual drive current exceeds the standard.

8. The electronic device according to claim 7, wherein the power function is a piecewise function.

9. The electronic device according to claim 8, wherein the detecting of the drive currents corresponding to the plurality of power factors of the display panel comprises: detecting a drive current corresponding to a power factor at a demarcation point of the power function.

10. The electronic device according to claim 7, wherein the calculating of the standard drive current of the display panel comprises: calculating a standard drive current corresponding to each power factor of the display panel, and storing the standard drive current in the memory.

11. The electronic device according to claim 10, wherein the determining of whether the actual drive current exceeds the standard drive current by comparing the actual drive current with the standard drive current comprises:
- obtaining the standard drive current as stored in the memory;
- multiplying the standard drive current by a specified coefficient to obtain a standard drive current threshold;
- comparing the actual drive current with the standard drive current threshold; and
- determining that the actual drive current exceeds the standard when the actual drive current is greater than the standard drive current threshold.

12. The electronic device according to claim 7, wherein the regulating of the actual drive current if the actual drive current exceeds the standard comprises: reducing a drive voltage when the actual drive current exceeds the standard to reduce the actual drive current.

13. A non-transitory computer-readable storage medium storing a computer program thereon, wherein, when the computer program is executed by a processor, a method for controlling a drive current of a display panel is implemented, the method comprising:
- determining a power function of the display panel by:
  - detecting drive currents corresponding to a plurality of power factors of the display panel, the power factor being a ratio of a sum of brightnesses of lit pixels on the display panel to a sum of maximum brightnesses of all pixels; and
  - determining the power function of the display panel based on the drive currents corresponding to the plurality of power factors of the display panel and a type of the power function;

calculating a standard drive current of the display panel based on the power function;

detecting an actual drive current of the display panel;

determining whether the actual drive current exceeds the standard drive current by comparing the actual drive current with the standard drive current; and regulating the actual drive current when the actual drive current exceeds the standard.

14. The non-transitory computer-readable storage medium according to claim 13, wherein the power function is a piecewise function.

15. The non-transitory computer-readable storage medium according to claim 14, wherein the detecting of the drive currents corresponding to the plurality of power factors of the display panel comprises: detecting a drive current corresponding to a power factor at a demarcation point of the power function.

16. The non-transitory computer-readable storage medium according to claim 13, wherein the calculating of the standard drive current of the display panel comprises: calculating a standard drive current corresponding to each power factor of the display panel, and storing the standard drive current in memory.

17. The non-transitory computer-readable storage medium according to claim 16, wherein the determining of whether the actual drive current exceeds the standard drive current by comparing the actual drive current with the standard drive current comprises:

obtaining the standard drive current as stored in the memory;

multiplying the standard drive current by a specified coefficient to obtain a standard drive current threshold;

comparing the actual drive current with the standard drive current threshold; and determining that the actual drive current exceeds the standard when the actual drive current is greater than the standard drive current threshold.

* * * * *